United States Patent [19]
Leichliter

[11] 3,899,059
[45] Aug. 12, 1975

[54] FLUID COUPLING ASSEMBLY

[75] Inventor: Wayne K. Leichliter, Marshall, Mich.

[73] Assignee: Eaton Corporation, Cleveland, Ohio

[22] Filed: Oct. 23, 1973

[21] Appl. No.: 408,888

[52] U.S. Cl. .................. 192/57; 192/58 B; 64/30 R
[51] Int. Cl.² .................... F16D 35/00; F16D 67/00
[58] Field of Search ......... 192/57, 58 B, 48.3, 82 T; 64/30 R

[56] References Cited
UNITED STATES PATENTS

| | | | |
|---|---|---|---|
| 2,895,575 | 7/1959 | Lamont | 192/57 |
| 2,963,135 | 12/1960 | Weir | 192/57 |
| 3,053,363 | 9/1962 | Weir | 192/58 B |
| 3,498,431 | 3/1970 | Sutaruk | 192/57 |
| 3,584,716 | 6/1971 | Coty | 192/58 B |

*Primary Examiner*—Allan D. Herrmann
*Attorney, Agent, or Firm*—Teagno & Toddy

[57] ABSTRACT

An improved fluid coupling assembly includes input and output members having shear surfaces which cooperate with a fluid medium during relative rotation between the coupling members to provide a fluid drive between the coupling members. A resiliently deflectable friction spring is partially compressed between the coupling members at a location outwardly from the shear surfaces to prevent relative rotation between the coupling members during low speed rotation of the input member. During high speed rotation of the input member, the friction spring transmits drive forces between the coupling members. Since the friction spring is partially compressed between the coupling members, the spring provides a preload force which retards wobble between the coupling members. The friction spring is located and arranged to be immersed in the fluid medium at all operating conditions of the coupling assembly.

24 Claims, 6 Drawing Figures

FLUID COUPLING ASSEMBLY

BACKGROUND OF THE INVENTION

This invention relates generally to a fluid coupling and more specifically to a fluid coupling wherein a friction spring is effective to apply a force to input and output coupling members to retard wobble and relative rotation between the coupling members.

One known coupling assembly is disclosed in U.S. Pat. No. 2,963,135 and includes an input coupling member with resilient sections which are effective to press friction linings against an output coupling member during low speed rotation of the input coupling member. During high speed rotation of the input coupling member, the spring sections of the known coupling are deflected under the influence of centrifugal force to move the friction surfaces out of engagement with the output coupling member. When this occurs, the drive between the input and output members is shifted from a friction drive to a fluid drive. It should be noted that the spring sections of this known coupling are ineffective during high speed rotation of the input member to prevent wobble between the coupling members and to provide a friction drive between the coupling members.

Another known coupling assembly is disclosed in U.S. Pat. No. 3,628,641. This patent discloses input and output members having interfitted shear surfaces to provide a fluid drive between the coupling members. A wear-cushion member is engaged by the input member during wobble between the coupling members.

SUMMARY OF THE PRESENT INVENTION

The present invention provides a coupling assembly having shear surfaces which cooperate with a fluid medium to provide a fluid drive upon the occurrence of relative rotation between input and output members. During low speed rotation of the input member, relative rotation between the coupling members is prevented by a friction spring. During high speed rotation of the input member, the spring assists the fluid drive in transmitting forces from the input member to the output member. Thus, the spring provides a lockup at or near engine idle speeds and a controllable torque output level after relative rotation occurs between the input and output members. The friction spring is located radially outwardly of the viscous shear portion of the coupling so that the friction spring is immersed in viscous fluid at all operating conditions.

The friction spring is at least partially compressed between the coupling members to provide a preload force which retards wobble of the output member relative to the input member. This preload force is directed parallel to the axis of rotation of the coupling members in such a manner as to compensate for dimensional tolerances. Due to the presence of the preload force, wobble is minimized as the coupling members are rotated about their central axes.

Accordingly it is an object of this invention to provide a new and improved coupling assembly having shear surfaces which cooperate with a fluid medium to provide a fluid drive upon relative rotation between input and output coupling members and a frictional drive spring which is effective to prevent relative rotation between the input and output coupling members during low speed rotation of the input member and is effective to transmit drive forces between the coupling members during high speed rotation of the input member.

Another object of this invention is to provide a new and improved coupling assembly which includes a friction spring which is at least partially compressed between input and output coupling members to provide a preload force which tends to retard the occurrence of wobble between the coupling members at all operating conditions.

BRIEF DESCRIPTION OF THE DRAWINGS

The foregoing and other objects and features of the invention will become more apparent upon a consideration of the following description taken in connection with the accompanying drawings wherein.

DESCRIPTION OF ONE PREFERRED EMBODIMENT OF THE INVENTION

Figure 1:
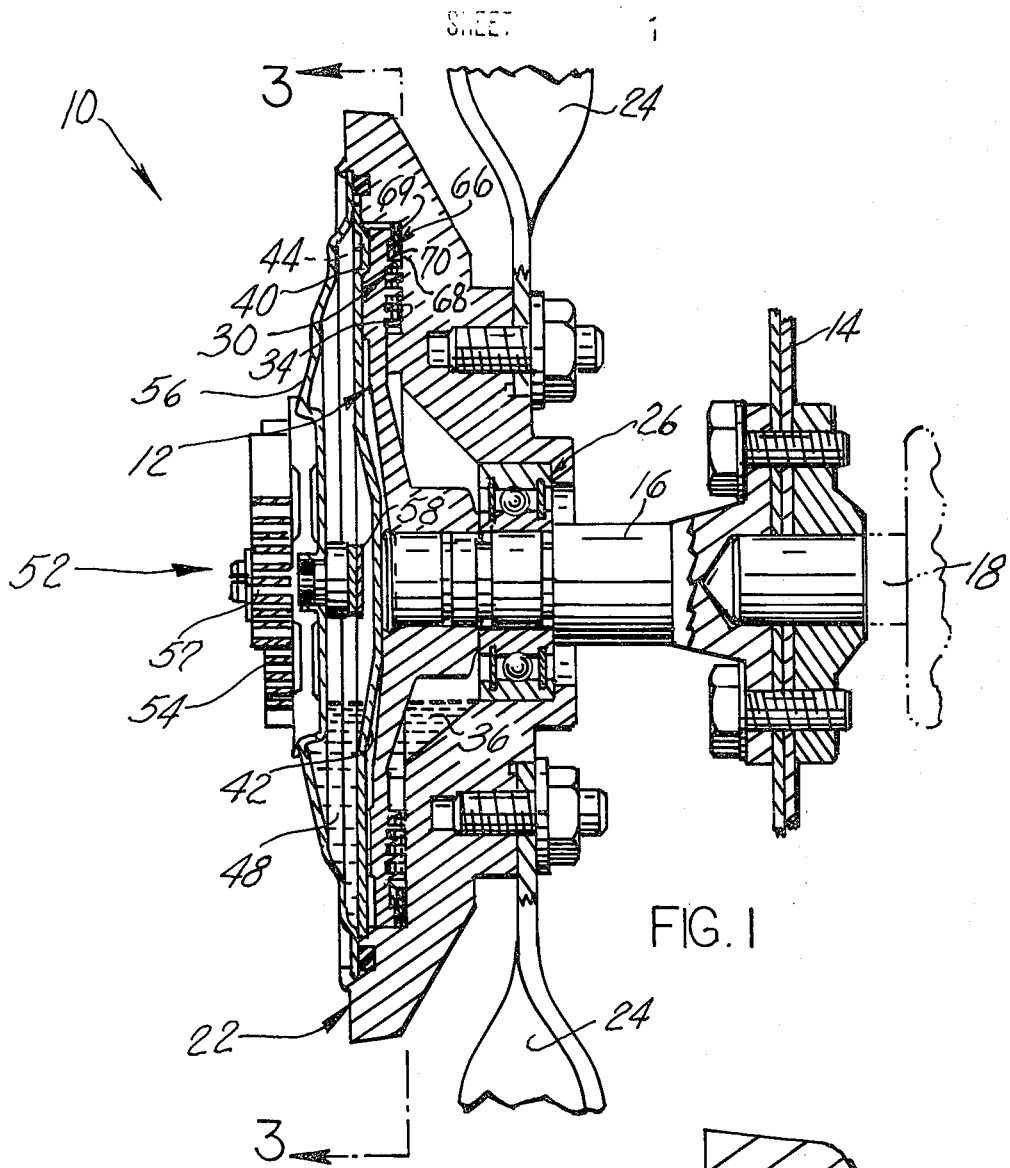
FIG. 1 is an axial sectional view of a fluid coupling constructed in accordance with the present invention.

A fluid coupling 10 constructed in accordance with the present invention includes a circular input member 12 which is driven by a pulley 14 through a rotatable input shaft 16. The input shaft 16 is fixedly connected to the input member 12 and is supported on a rotatable stub shaft 18 mounted on an engine block. Upon rotation of the input member 12, an output member 22 is driven to rotate fan blades 24 to cool the engine. The output member 22 is rotatably supported on the input shaft 16 by a bearing assembly 26 so that relative rotation can occur between the input member 12 and output member.

During relative rotation between the input and output members 12 and 22, a fluid drive arrangement 30 transmits viscous shear drive forces between the input and output members. The fluid drive arrangement 30 includes circular shear surfaces formed on annular lands 32 (FIG. 2) on the input member 12. The lands on the input member 12 are interfitted with annular grooves 34 on the output member 22. The opposed surfaces of the lands 32 and grooves 34 extend in close parallel face-to-face relationship and have an intervening shear space therebetween. Upon rotation of the circular input disk or member 12 relative to the circular output member 22, a fluid medium 36 in the shear spaces between the surfaces on the interfitted grooves 34 and lands 32 transmits torque between the input and output members 12 and 22 by a shear action of the fluid. In addition, pumping elements 40 are effective to pump fluid 36 from a working chamber 42 through openings 44 in a partition 46 to a reservoir or storage chamber 48.

When the engine is being operated in a relatively cold or cool environment, the fan blades 24 do not have to be driven. Therefore, a temperature responsive valve arrangement 52 cooperates with the pumping elements 40 to effect a reduction in the level of fluid 36 in the working chamber 42 and a reduction in the fluid drive force between the input and output members 12 and 22. Similarly, when the engine is being operated in a relatively hot environment it is desirable to rotate the blades 24 to provide a cooling stream of air and the temperature responsive valve arrangement 52 cooperates with the pumping elements 40 to increase the level of fluid in the working chamber 42 to thereby increase the fluid drive forces transmitted between the input and output members 12 and 22.

The temperature responsive valve assembly 52 is of a known construction and includes a temperature responsive spiral coil 54 mounted on an outer cover 56 and connected by a stub shaft 57 with a valve member or arm 58 in the reservoir 48. The manner in which the temperature responsive coil 54, valve member 58 and pumping elements 40 cooperate to control the level of fluid 34 in the working chamber 42 is the same as is disclosed in U.S. Pat. No. 3,268,041 and will not be further described herein to avoid prolixity of description. However, it should be understood that other temperature responsive valve and pumping arrangements could be utilized if desired. For example, the valve and pumping arrangements disclosed in U.S. Pats. No. 3,259,219 and 3,272,293 could be utilized.

Figure 2:
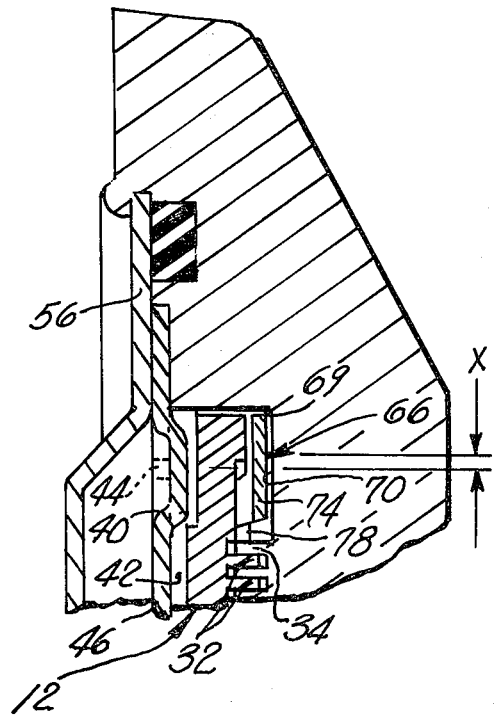
FIG. 2 is an enlarged fragmentary sectional view of a portion of the coupling assembly of FIG. 1 and illustrating the relationship between a frictional drive spring and a pair of coupling members.
Figure 3:
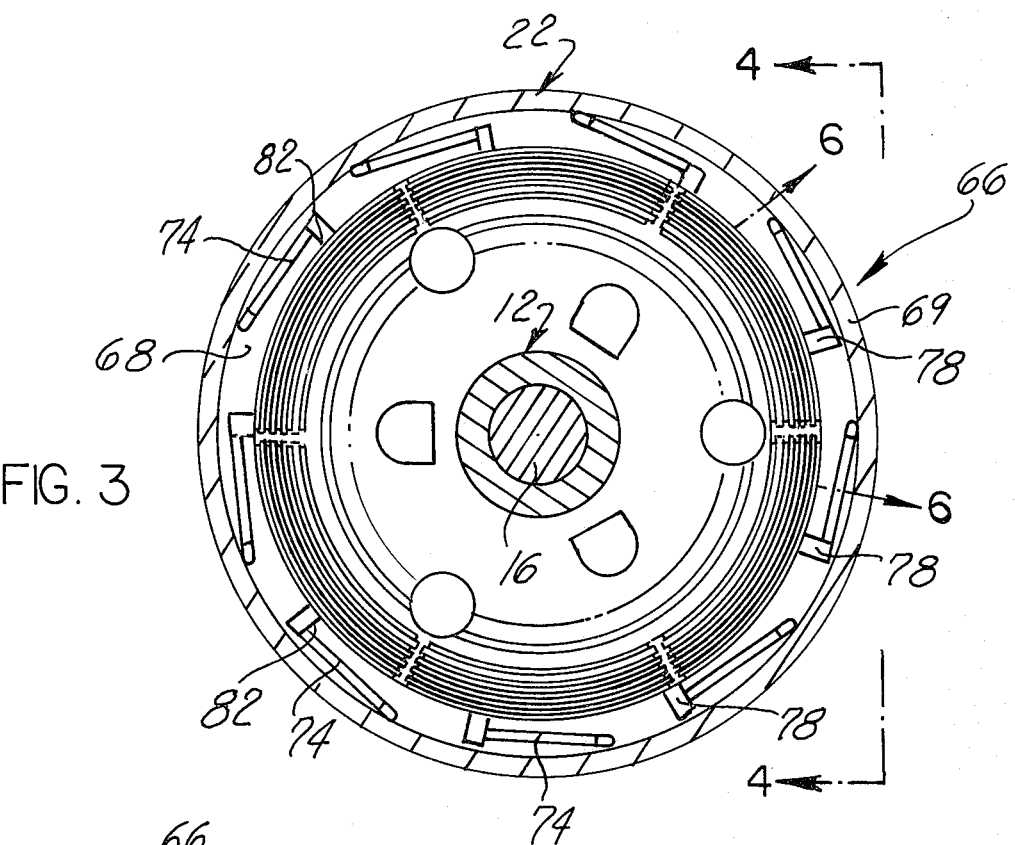
FIG. 3 is a sectional view, looking in the direction of line 3—3 in FIG. 1, and illustrating the arrangement of the friction drive spring.
Figure 4:
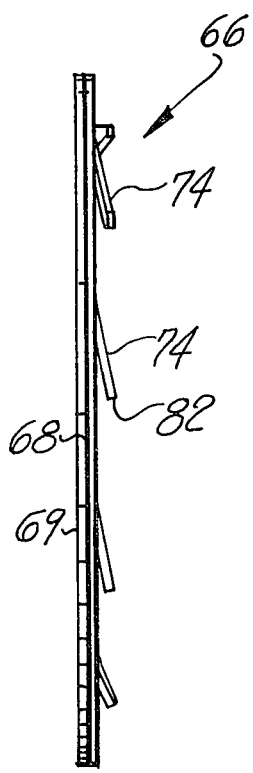
FIG. 4 is an elevational view, taken generally along the line 4—4 of FIG. 3, illustrating the relationship between spring fingers and a base portion of the spring.

In accordance with a feature of the present invention, a friction spring 60 (see FIGS. 3 and 4) is disposed between the input and output coupling members 12 and 22 in the manner illustrated in FIGS. 1 and 2. The spring 60 prevents relative rotation between the input and output coupling members 12 and 22 during low speed rotation of the input member 12. Upon the occurrence of high speed rotation of input member 12 and relative rotation between the input and output members, the friction spring 60 assists the fluid drive arrangement 30 in transmitting drive forces from the input coupling member 12 to the output coupling member 22. In addition, the spring 60 provides an axial preload force which retards wobble between the input and output coupling members 12 and 22.

Figure 6:
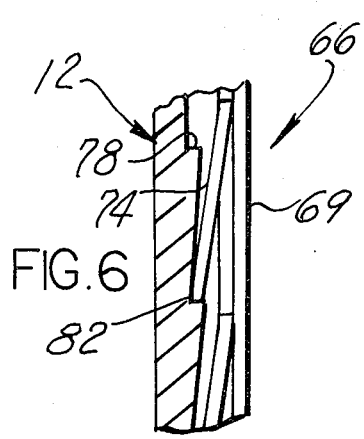
FIG. 6 is a sectional view taken along the lines 6—6 of FIG. 3 illustrating the engagement of the fingers of the spring with serrations in the input member to provide a drive connection therebetween.

The spring 60 has an annular base 68 having a frictional surface 69 thereon which is disposed in abutting engagement with an annular surface 70 of the output coupling member 22 at a location radially outwardly of the interfitting lands and grooves 32 and 34 of the fluid drive arrangement 30 and also outwardly a small distance (X) (see FIG. 2) of the fluid outlet 44 whereby the friction surface 69 will always be immersed in shear fluid at all operating conditions of the coupling member. Although the frictional material of surface 69 is shown as being attached to the spring 66 at surface 68 in the preferred embodiment, it will be appreciated that use of a separate frictional material could be eliminated by careful choice of spring and output member materials to provide the necessary coefficient of friction for the application under consideration. In this case it may also be necessary to provide a liner (not shown) for the output member to achieve the desired friction and/or wear characteristics. A plurality of spring fingers 74 (see FIGS. 3 and 4) are integrally formed with and project axially outwardly from the base 68 into engagement with an annular serrated surface 78 (see FIG. 6) on a radially outer portion of the input disk or member 12. When the spring 66 is in the unrestrained or free condition illustrated in FIG. 4, outer end portions 82 of the spring fingers 74 are disposed away from frictional face 69 on the base 68 by a distance which is greater than the spacing between the surfaces 70 and 78 (see FIG. 2) on the input and output members 12 and 22. Therefore, the spring 66 is partially compressed between the input and output members 12 and 22 and is effective to apply axially directed preload forces to the input and output members. These axially directed preload forces retard wobble and provide frictional drive engagement between the input and output members 12 and 22.

Upon rotation of the input shaft 16 at or near engine idle speeds, the frictional engagement of frictional surface 69 with output member 22 prevents relative rotation between the input and output coupling members 12 and 22. Thus at low engine speeds regardless of whether the viscous shear portion of the coupling is engaged or disengaged, the speed of rotation of the output member 22 is equal to the speed of rotation of the input member 12. This is depicted by performance curves 86*d* (disengaged) and 86*e* (engaged) (see FIG. 5) for the coupling assembly 10. During low speed rotation of the input shaft 16 and coupling member 12, the relationship between input and output speeds is shown by a linear portion 88 of the curves 86*d* and 86*e* which follow a direct drive line. However, as the speed of rotation of the input shaft 16 and coupling member 12 increases, relative rotation occurs between the input and output members because of increased fan load in the manner illustrated graphically by the horizontal portions of the curves. As relative rotation occurs between the input and output members 12 and 22, the fluid drive arrangement 30 is effective to transmit fluid shear or drive forces from the input member 12 to the output coupling member 22. In addition, friction surface 69 because of the bias from the spring fingers 74 is effective to transmit a frictional torque or drive force from the input member 12 to the output member 22. Thus, the spring 66 assists the fluid drive arrangement 30 in transmitting torque or drive forces from the input member 12 to the output member 22 during relative rotation between the input and output members.

Figure 5:
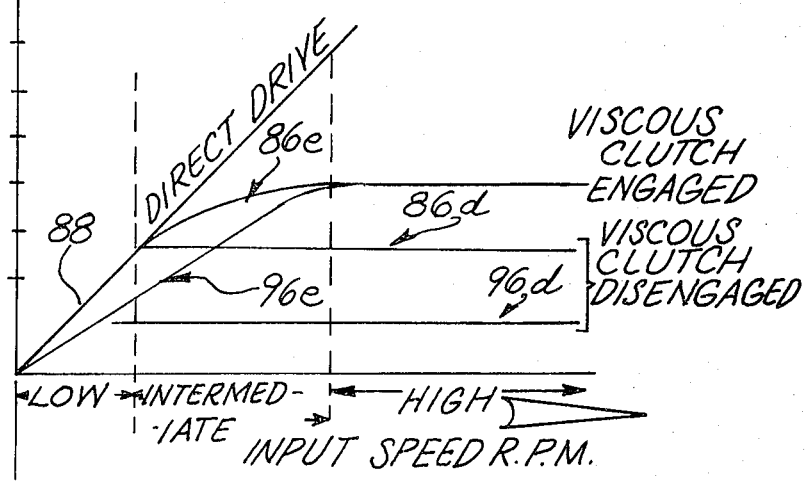
FIG. 5 is a graph illustrating the performance of a coupling having the spring of FIGS. 3 and 4 and of a similar coupling in which the spring is omitted.

The performance of a coupling assembly, similar to the coupling assembly 10 but lacking the friction spring 60, is illustrated by the curves 96*d* and 96 *e* in FIG. 5. It should be noted that during relatively low and intermediate speed of rotation of the input member, the speed of rotation of the output member is somewhat less than the speed of rotation of the input member. In addition, it should be noted that in the disengaged mode, during high speed rotation of the input member the output member rotates at a lower speed than does the output member of a similar coupling assembly which includes the frictional drive spring 60. This is because the friction surface 69 interconnects the input and output members 12 and 22 so that they rotate together during low speed rotation of the input member 12. However, upon the occurrence of high speed rotation of the input member the frictional surface 69 begins to slip relative to the annular surface 70 on the output member 22. The fingers 74 cannot slip relative to the input member because of serrations 78. During relative rotation of the input and output members 12 and 22, the frictional surface 69 runs on a hydrodynamic film formed between the surface 69 on the spring and the annular surface 70 to reduce wear. Although the surface 69 slides on a thin film of fluid, the spring is effective to transmit dynamic frictional torque forces between the input and output members. These torque forces account for the high level of the curves 86e and 86d relative to the curves 96e and 96d at low or intermediate input speeds. Of course in the engaged mode of operation both clutches by design must have the same terminal output speed with or without the finger spring as this is governed by design criteria apart from the coupling itself.

In addition to transmitting force between the input and output members 12 and 22, the spring 60 reduces wobble between the input and output members. This is because the spring fingers 74 are partially compressed at all times between the input and output members and exert a uniform axial force around the outermost circumference between the surfaces 70 and 78. The axial force against the surface 70 is exerted by the friction material 69 on the annular base 68 of the spring. The spring fingers 74 apply an axially directed force to the input member 12 at spaced apart locations about the periphery of the input member. Since these axial forces tend to urge the input and output members 12 and 22 apart, they tend to hold the surface 78 on the input member 12 in relationship to the surface 70 on the output member 22. This reduces wobble of the output member 22 relative to the input member 12 so that the surface 70 does not move out of a plane of rotation which is perpendicular to the common axis of rotation of the input and output members 12 and 22. The preload force caused by compressing the spring fingers 74 between the input and output members enables the spring 60 to prevent wobble between the input and output members during start up of the engine as well as during high speed rotation of the input shaft 16.

In view of the foregoing description it can be seen that the coupling assembly 10 has shear surfaces on lands 32 and grooves 34 to provide a fluid drive upon the occurence of relative rotation between input and output members 12 and 22. During low speed rotation of the input member 12, relative rotation between the coupling members 12 and 22 is prevented by the spring 60. During high speed rotation of the input member 12, the spring 66 assists the fluid drive in transmitting forces from the input member to the output member 22. Thus, the spring 60 provides a lockup at or near engine idle speeds and a controllable torque output level after relative rotation occurs between the input and output members 12 and 22.

The spring 60 is at least partially compressed between the coupling members 12 and 22 to provide a preload force which retards wobble of the output member relative to the input member. This preload force is directed parallel to the axis of rotation of the coupling members in such a manner as to compensate for dimensional tolerances. Due to the presence of the preload force, wobble, is reduced as the coupling members are rotated about their central axes.

Having described a specific preferred embodiment of the invention, the following is claimed:

1. A fluid coupling comprising an input coupling member capable of being rotated at relatively high and low speeds, a rotatable output coupling member disposed adjacent to said input coupling member, means for supporting said coupling members for relative rotation, said input and output coupling members having spaced apart opposed surface portions defining a fluid shear space therebetween and cooperating with a fluid shear medium during relative rotation between said coupling members to provide a fluid drive between said coupling members, and resiliently deflectable spring means spaced from said shear space for preventing relative rotation between said coupling members during low speed rotation of said input coupling member and for assisting said fluid drive in transmitting forces from said input coupling member to said output coupling member during relative rotation between said coupling members.

2. A fluid coupling as set forth in claim 1 wherein said spring means is at least partially compressed between said coupling members prior to rotation of said input coupling member to provide a preload force tending to retard wobble of one of said coupling members relative to the other of said coupling members.

3. A fluid coupling as set forth in claim 1 wherein said spring means includes an annular base disposed adjacent one of said coupling members and a plurality of spring fingers projecting axially outwardly from said base into engagement with the other of said coupling members.

4. A fluid coupling comprising an input coupling member capable of being rotated at relatively high and low speeds, a rotatable output coupling member disposed adjacent to said input coupling member, means for supporting said coupling members for relative rotation, said input and output coupling members having spaced apart opposed surface portions defining a fluid shear space therebetween and cooperating with a fluid shear medium during relative rotation between said coupling members to provide a fluid drive between said coupling members, and resiliently deflectable spring means spaced from said shear space for preventing relative rotation between said coupling members during low speed rotation of said input coupling member and for assisting said fluid drive in transmitting forces from said input coupling member to said output coupling member during relative rotation between said coupling members, said spring means including an annular base disposed adjacent one of said coupling members and a plurality of spring fingers projecting axially outwardly from said base into engagement with the other of said coupling members, said spring fingers having an elongated configuration and extending circumferentially along and axially outwardly from said base and wherein said annular base has a surface of frictional material thereon.

5. A fluid coupling comprising an input coupling member capable of being rotated at relatively high and low speeds, a rotatable output coupling member disposed adjacent to said input coupling member, means for supporting said coupling members for relative rotation, said input and output coupling members having spaced apart opposed surface portions defining a fluid shear space therebetween and cooperating with a fluid shear medium during relative rotation between said coupling members to provide a fluid drive between said coupling members, said sheer space having a generally circular configuration, and resiliently deflectable spring means spaced from said shear space for preventing relative rotation between said coupling members during low speed rotation of said input coupling member and for assisting said fluid drive in transmitting forces from said input coupling member to said output coupling member during relative rotation between said coupling members, said spring means being disposed radially outwardly of said shear space.

6. A fluid coupling as set forth in claim 5 wherein said spring means includes an annular base which circumscribes said shear space and a plurality of spring fingers which project from said base and engage one of said coupling members at spaced apart locations.

7. A fluid coupling as set forth in claim 5 wherein said spring means includes an annular base disposed adjacent one of said coupling members and a plurality of spring fingers projecting axially outwardly from said base into engagement with the other of said coupling members.

8. A fluid coupling comprising an input coupling member capable of being rotated at relatively high and low speeds, a rotatable output coupling member disposed adjacent to said input coupling member, means for supporting said coupling members for relative rotation, said input and output coupling members having spaced apart opposed surface portions defining a fluid shear space therebetween and cooperating with a fluid shear medium during relative rotation between said coupling members to provide a fluid drive between said coupling members, and resiliently deflectable spring means spaced from said shear space for preventing relative rotation between said coupling members during low speed rotation of said input coupling member and for assisting said fluid drive in transmitting forces from said input coupling member to said output coupling member during relative rotation between said coupling members, one of said coupling members having a plurality of generally annular projections on which one of said surface portions is disposed and which are interfitted with annular grooves defined by the other of said portions on said other coupling member, said spring means being disposed radially outwardly of said annular projections and grooves and being at least partially compressed between said coupling members at all times to provide an axially directed preload force which tends to retard wobble of one of said coupling members relative to the other of said coupling members.

9. A fluid coupling comprising a rotatable input coupling member, a rotatable output coupling member disposed adjacent to said input coupling member, means for supporting said coupling members for rotation relative to each other in such a manner as to allow at least some wobble to occur between said coupling members during rotation thereof, said input and output coupling members having spaced apart surface portions defining a fluid shear space therebetween and cooperating with a fluid shear medium relative rotation between said coupling members to provide a fluid drive between said coupling members, and resiliently deflectable spring means partially compressed between said coupling members at all times to provide an axially directed preload force to retard wobble of one of said coupling members relative to the other of said coupling members, said spring means including an annular base having a friction surface disposed in abutting engagement with one of said coupling members and a plurality of spring elements which extend outwardly from said base into engagement with the other of said coupling members at a plurality of spaced apart locations.

10. A fluid coupling as set forth in cliam 9 wherein said surface portions include first and second annular surfaces formed on said coupling members radially inwardly of said base and cooperating with the fluid shear medium during relative rotation between said coupling members to provide a fluid drive between said coupling members.

11. A fluid coupling as set forth in claim 10 further including temperature responsive means for varying the amount of the fluid shear medium available to cooperate with said first and second annular surfaces during relative rotation between said coupling members.

12. A fluid coupling as set forth in claim 9 wherein spring fingers have an elongated configuration and extend circumferentially along and axially outwardly from said base and wherein said annular base has a surface of frictional material thereon.

13. A fluid coupling comprising a rotatable input coupling member, a rotatable output coupling member disposed adjacent to said input coupling member, means for supporting said coupling members for rotation relative to each other in such a manner as to allow at least some wobble to occur between said coupling members during rotation thereof, said input and output coupling members having spaced apart surface portions defining a fluid shear space therebetween and cooperating with a fluid shear medium during relative rotation between said coupling members to provide a fluid drive between said coupling members, and resiliently deflectable spring means partially compressed between said coupling members at all times to provide an axially directed preload force to retard wobble of one of said coupling members relative to the other of said coupling members.

14. A fluid coupling as set forth in claim 13 wherein said spring means includes a plurality of spaced apart spring elements disposed in a circular array, said spring elements being effective to apply preload forces to one of said coupling members at spaced apart locations which are disposed at the same distance from the center of rotation of said one of said coupling members.

15. The invention of claim 13 wherein said coupling includes means for pumping fluid from said shear space including a fluid outlet therefrom and wherein said resiliently deflectable spring means is spaced radially outwardly of said fluid outlet.

16. A fluid coupling comprising a rotatable input coupling member, a rotatable output coupling member disposed adjacent to said input coupling member, means for supporting said coupling members for rotation relative to each other in such a manner as to allow at least some wobble to occur between said coupling members during rotation thereof, said input and output coupling members having spaced apart surface portions defining a fluid shear space therebetween and cooperating with a fluid shear medium during relative rotation between said coupling members to provide a fluid drive between said coupling members, and resiliently deflectable spring means partially compressed between said coupling members to provide an axially directed preload force to retard wobble of one of said coupling members relative to the other of said coupling members, said spring means including at least one resiliently compressible spring element disposed between said coupling members and having a first surface portion disposed in abutting engagement with said input coupling member and a second surface portion disposed in abutting engagement with said output coupling member.

17. A fluid coupling as set forth in claim 16 wherein said spring means further includes a plurality of spaced apart spring elements disposed in a circular array which includes said one spring element, all of said spring elements being effective to continuously apply preload forces to one of said coupling members at spaced apart locations to provide an uninterrupted preload force which continuously retards wobble between the coupling members.

18. The invention of claim 16 wherein said coupling includes means for pumping fluid from said shear space including a fluid outlet therefrom and wherein said resiliently deflectable spring means is spaced radially outwardly of said fluid outlet.

19. A fluid coupling as set forth in claim 16 wherein said surface portions of said input and output coupling members include first and second annular surfaces formed on said coupling members inwardly of said spring element and cooperating with the fluid shear medium during relative rotation between said coupling members to provide a fluid drive between said coupling members.

20. A fluid coupling as set forth in claim 19 further including temperature responsive means for varying the amount of the fluid shear medium available to cooperate with said first and second annular surfaces during relative rotation between said coupling members.

21. For use with a cooling fan operable with a vehicular engine, a viscous fluid drive mechanism comprising first and second relatively rotatable drive means, said first drive means being rotatably mounted by bearings on a central shaft and having an annular operating chamber formed therein, said second drive means being secured at its center to said central shaft and extending radially outwardly into said annular operating chamber so as to provide a predtermined shear space intermediate said first and second drive means, said shear space being operable with a fluid medium to provide a shear-type fluid drive between said first and second drive means, and independent annular friction ring means operatively connected in said annular operating chamber for frictionally contacting adjacent outer portions of said first and second drive means for providing a substantially nonslip drive connection between said first and second drive means at low engine rpms or idle conditions.

22. A viscous fluid drive mechanism comprising first and second relatively rotatable drive means, said first drive means being rotatably mounted by bearings on a central shaft and having an annular operating chamber formed therein, said second drive means having a hub secured to said central shaft and extending radially outwardly into said annular operating chamber, a plurality of annular ridges formed on one of said first and second drive means and a plurality of cooperating annular grooves formed on the other of said first and second drive means, said annular ridges and grooves forming a shear space therebetween and operable with a fluid medium to provide a shear-type fluid drive between said first and second drive means, and independent resilient friction means compressed in said annular operating chamber intermediate adjacent portions of said first and second drive means for providing high fan speeds at low engine rpms or idle conditions.

23. A viscous fluid drive mechanism comprising first and second relatively rotatable drive means, said first drive means being rotatably mounted by bearings on a central shaft and having an annular operating chamber formed therein, said second drive means having a hub secured to said central shaft and extending radially outwardly into said annular operating chamber so as to provide a predetermined shear space intermediate said first and second drive means, said shear space being operable with a fluid medium to provide a shear-type fluid drive between said first and second drive means, and spring-loaded friction means operatively connected in said annular operating chamber intermediate said first and second drive means for providing high fan speeds at low engine rpms or idle conditions, said spring-loaded friction means including a washer member secured for rotation with one of said first and second drive means at the radial outer portion of said annular operating chamber.

24. A viscous fluid clutch comprising a housing rotatably mounted by bearings on a central shaft and having an annular operating chamber formed therein, a clutch plate enclosed by said housing and having a hub secured to said central shaft with the remainder of said clutch plate extending substantially radially outwardly into said operating chamber, a plurality of annular ridges formed on one of said housing and said clutch plate and a plurality of cooperating annular grooves formed on the other of said housing and said clutch plate in said operating chamber, said annular ridges and grooves forming a shear space therebetween and operable with a fluid medium to provide a shear-type fluid drive between said housing and said clutch plate, a disc assembly compressed in said annular operating chamber between said housing and said clutch plate, said disc assembly including an annular washer member slidably secured in said housing adjacent the outer periphery of the side wall of said operating chamber, a layer of friction material formed on the face of said annular washer member adjacent said clutch plate, and spring fingers formed on the other face of said annular washer member in contact with said housing and being compressed intermediate said housing and said clutch plate.

* * * * *